United States Patent [19]

Sharp

[11] 4,290,414
[45] Sep. 22, 1981

[54] SOLAR HEATING COLLECTORS

[76] Inventor: John Sharp, P.O. Box 198, St. Leonards, New South, Wales, 2065, Australia

[21] Appl. No.: 64,637

[22] Filed: Aug. 7, 1979

[51] Int. Cl.³ .............................. F24J 3/02; F28F 9/02
[52] U.S. Cl. .................... 126/429; 126/444; 126/448; 126/450; 165/173
[58] Field of Search ............... 126/429, 435, 450, 444, 126/445, 446, 447, 417, 448, 449; 165/173, 177, 172

[56] References Cited

U.S. PATENT DOCUMENTS

| 3,985,117 | 10/1976 | Sallen | 126/447 |
| 4,062,350 | 12/1977 | Reed | 126/444 |
| 4,062,352 | 12/1977 | Lesk | 126/444 |
| 4,068,652 | 1/1978 | Worthington | 126/429 |
| 4,083,360 | 4/1978 | Courvoisier et al. | 126/447 |
| 4,094,301 | 6/1978 | Sorenson et al. | 126/447 |
| 4,098,262 | 7/1978 | Peters | 126/444 |
| 4,120,287 | 10/1978 | Marles et al. | 126/447 |
| 4,144,875 | 3/1979 | Bruno et al. | 126/447 |
| 4,182,013 | 1/1980 | Grossman | 126/447 |

FOREIGN PATENT DOCUMENTS 2700015   7/1978   Fed. Rep. of Germany ...... 126/447

Primary Examiner—Daniel J. O'Connor
Attorney, Agent, or Firm—Stevens, Davis, Miller & Mosher

[57] ABSTRACT

A plate type solar absorber is provided with two sets of ducts each with its own header system. The ducts of each set are proportioned to provide for greater and lesser flow rates of liquid to be heated and may be selectively operated to provide heated liquid at differing temperatures. Means are provided to enable air for room heating to be drawn into a building through the set of larger ducts.

3 Claims, 8 Drawing Figures

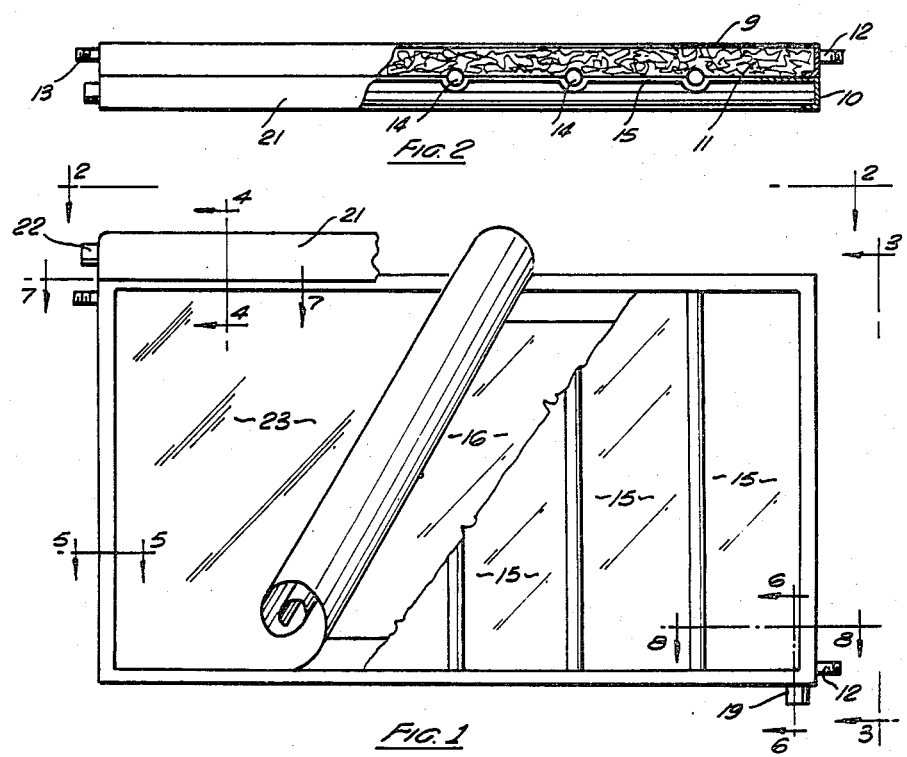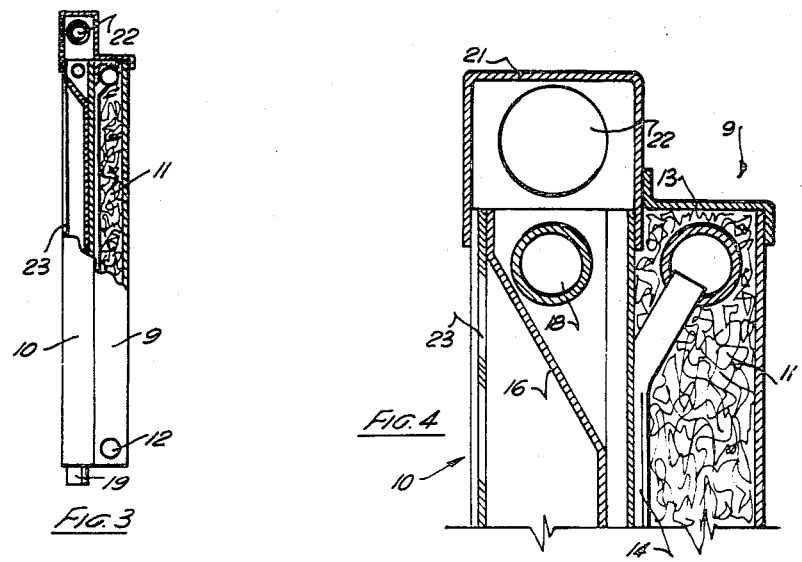

1

SOLAR HEATING COLLECTORS

BACKGROUND OF THE INVENTION

This invention relates to solar energy collectors. A problem associated with such collectors is to arrange for the correct or approximately correct temperature to be reached by the fluid being heated as the heater is in use. In some cases smallish quantities of high temperature fluid are required, in other cases greater quantities of lower temperature fluid are required and hitherto it has been necessary to design the collector for the particular application envisaged for it.

SUMMARY OF INVENTION

An object of the present invention is to provide a collector which easily and simply provides for two modes of operation to suit any instances in which both high and low grade heated fluid is required at the one location. For example, collectors according to the invention are adapted for use in instances in which the high grade fluid is required for domestic water heating and the low grade fluid required for home swimming pool heating. Whereas the collector is applicable to any such situation, for the sake of simplicity it is described hereinafter in relation to a combined domestic hot water heater and swimming pool heater.

According to preferred embodiments of the invention, it provides for a third mode of operation, namely use for heating air for space heating within a dwelling or other building.

The invention is applicable to plate type collectors of the kind comprising an extended metal or other conductive absorber sheet furnished with a plurality of fluid flow ducts extending from one end of the sheet to the other and with heater passages interconnecting and extending laterally of said ducts. In use the sheet is arranged so as to be inclined with one heater at the upper end and the other at the lower end and the ducts are disposed in a spaced apart array extending from one heater to the other. Each duct is in good thermal conductive relationship with the absorber sheet and thus when exposed to the heat of the sun fluid in the ducts is heated and a flow is established from the lower header to the upper header. In many cases the ducts comprise tubes or the like soldered or otherwise adhered to the absorber sheet and may be either on its upper face or its lower face. In other instances the sheet and ducts may be integrally united for example they may be formed as a single plastics extrusion.

According to the invention a plate type solar energy collector of the above described kind is provided characterised in that it includes two sets of ducts each with its respective header means.

The ducts of one set are of small cross-sectional dimensions and they together with their associated headers are used when a high temperature is required in the output fluid. On the other hand the ducts of the second set have larger cross-sectional dimensions and are utilised when the lower temperature output is required.

BRIEF DESCRIPTION OF DRAWINGS

FIG. 1 is a front elevation of a solar energy collector according to the invention with parts of its outer components cut away to reveal the interior.

FIG. 2 is a plan view taken on line 2—2 of FIG. 1.

FIG. 3 is a side elevation taken on line 3—3 of FIG. 1.

FIG. 4 is a detailed sectional view taken on line 4—4 of FIG. 1 and drawn to a larger scale.

DESCRIPTION OF PREFERRED EMBODIMENT

Figure 6:
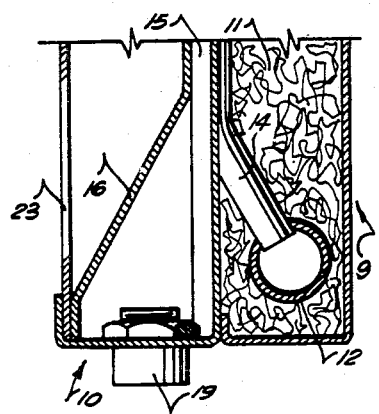
FIG. 6 is a detailed sectional view taken on line 6—6 of FIG. 1 drawn to a larger scale.
Figure 7:
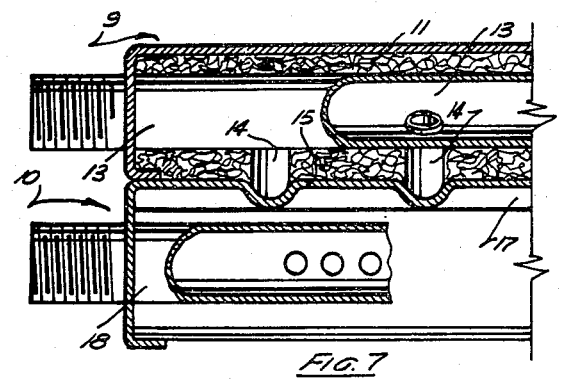
FIG. 7 is a detailed sectional view taken on line 7—7 of FIG. 1 drawn to a larger scale.
Figure 5:
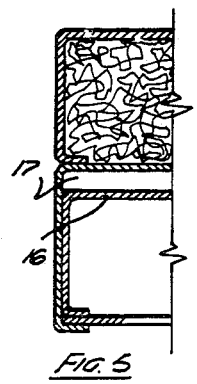
FIG. 5 is a detailed sectional view taken on line 5—5 of FIG. 1 drawn to a larger scale.
Figure 8:
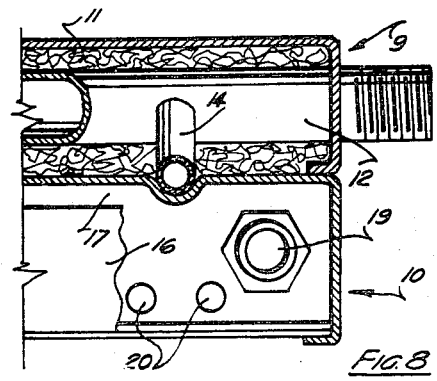
FIG. 8 is a sectional detailed view taken on line 8—8 of FIG. 1 drawn to a larger scale.

The illustrated embodiment of the invention comprises an outer casing itself comprising two tray-like members 9 and 10 resting one upon the other and secured together by welding or otherwise about the periphery of the lower member 9.

Member 9 is filled with polystyrene foam or other insulating medium 11 in which is embedded a lower inlet header 12 and an upper outlet header 13. A plurality of relatively small bore tubes 14 extend from one header 12 to the header 13 and constitute one set of ducts for the heating of fluid which is to be raised to a relatively high temperature. Generally but not necessarily, the fluid will be water. Throughout most of its length each tube 14 is in good thermal contact with the underside of corrugations in the floor 15 of the upper member 10 which floor constitutes an absorber sheet.

A second absorber sheet 16 is disposed within the member 10, it contacts the crests as seen from the upper side of the corrugations formed in the absorber sheet 15 thereby defining with the absorber sheet 15 a further plurality of ducts 17 respectively between neighbouring corrugations in the absorber sheet 15. The absorber sheet 16 at its upper and lower edges is inclined so as to diverge from the sheet 15 to provide space near the upper edge of the collector for a sparge tube 18 whereby water or other liquid to be heated to a relatively low temperature may be fed into the ducts 17 to move downwardly between the two sheets 15 and 16.

At the bottom edge of the collector the diverging edge margin of the sheet 16 provides a sump space into which the liquid flowing downwardly in ducts 17 collects for removal by way of a drain tube 19.

The lower rim of member 10 has a plurality of air inlet holes 20 formed in it. It will be appreciated that in use the collector is inclined so that the holes 20 are well above the open inner end of the tube 19 thereby avoiding the possibility of heated liquid escaping through them.

The upper edge of the member 10 is provided with an air chamber 21 with an air outlet pipe 22 at one end. Thus when the low grade heating system for liquid is not in use air may be drawn from pipe 21 by a suitable pump for delivery into a building for space heating therein, that air being heated by conduction and the radiation as it flows upwardly through the ducts 17.

The open mouth of member 10 is covered with a transparent sheet 23, which may be a sheet of a polycarbonate plastic or other material which is not only transparent to light but also substantially transparent to thermal radiation emanating from a high temperature source such as the sun.

For preference the absorber sheets 15 and 16 are of aluminium or copper and have a matt black surface coated with one of the newly developed surface finishes which tend to prevent re-radiation of absorbed energy.

In practice a plurality of collectors may be utilised in a single installation with their respective header means connected each to each (in series or in parallel), depending on the total heating capacity required.

The installation would also include suitable valve arrangements to permit selection of one or other set of ducts as the operative set at any particular time. If desired the valve or valves may be automatically operated by a timer or by a relay responsive to the intensity of sunlight for the time being.

In some embodiments of the invention the absorber plate may also be utilised as a roof cladding sheet so that the collector may be integral with the roof of a building or the like.

I claim:

1. A solar energy collector comprising:
a first and a second tray-like member resting one upon the other and secured together, each tray-like member including a floor and top, and sidewalls interconnecting said floor and top, said first tray-like member containing on opposite ends thereof respective fluid inlet and outlet headers, a plurality of thermally conductive tubes extending between said fluid inlet and outlet headers in thermal contact with the top wall of said first tray-like member, and an insulating material filling the interior space of said first tray-like member, the top of said first tray-like member forming the floor of said second tray-like member and being formed of heat absorbing material, said first tray-like member top having undulations therein respectively accomodating said plurality of tubes, said second tray-like member containing an additional heat absorbing wall between the top and floor thereof, said additional wall contacting with the crests of the undulations in the top of said first tray-like member to define a plurality of ducts between neighboring undulations, the cross-section of the ducts being greater than the cross-section of the tubes, said second tray-like member including an inlet header and outlet header connected to opposite ends of said ducts and the top of said second tray-like member being formed of a material transparent to light.

2. A solar energy collector as in claim 1 further comprising an air chamber provided on one end of said second tray-like member in fluid communication with said ducts and an air outlet provided on said chamber.

3. A solar energy collector as in claim 1 wherein venting air holes are provided in said second tray-like member.

* * * * *